United States Patent [19]

Petriano, Sr.

[11] Patent Number: 5,277,425
[45] Date of Patent: Jan. 11, 1994

[54] GOLF CLUB INCLUDING TURF REPAIR TOOL

[75] Inventor: Vincent J. Petriano, Sr., Fishkill, N.Y.

[73] Assignee: Greenskeeper Corp. of Dutchess, Hoewell Jct., N.Y.

[21] Appl. No.: 944,164

[22] Filed: Sep. 11, 1992

[51] Int. Cl.$^5$ .......................... A63B 53/00; A01B 1/04
[52] U.S. Cl. .............................. 273/162 F; 273/162 E; 172/381
[58] Field of Search .............. 273/162 F, 32 B, 162 E; 172/378, 379, 172/380, 381

[56] References Cited

U.S. PATENT DOCUMENTS 3,771,794  11/1973  Crockett .......................... 273/162 F
4,925,190  5/1990  Learned .......................... 273/162 F Primary Examiner—George J. Marlo

[57] ABSTRACT

A repair tool for ball marks on golf greens is mounted on the grip end of a putter. The tool comprises a disc-like base mounting a cylinder on its periphery that is formed with blades which project away from the putter. The blades taper to points at their free ends for easy insertion into the soil about a ball mark. The adjacent sides of adjacent blades slope inwardly away from each other to define cutting edges on their outer periphery and plowing surfaces effective to plow soil which has been loosened by the cutting edges inward upon rotation to fill the ball mark/dent. An expandable fastener having an upper surface is inserted through the grip into the hollow end of a putter shaft for securely mounting the tool in place, the lower end of the cylinder also engaging the grip.

5 Claims, 3 Drawing Sheets

GOLF CLUB INCLUDING TURF REPAIR TOOL

FIELD OF THE INVENTION

This invention relates to a golf-course green repair tool, and more particularly to a tool for easily repairing ball marks on the putting surfaces of golf-course greens.

BACKGROUND OF THE INVENTION

As is generally well-known, golf courses have a number of greens in each of which a hole, usually marked with a flag, is situated. The flag enables a distant, off-the-green, player (golfer) to appreciate the hole's location so that he may aim his golf ball thereat, the object of the game of golf being to get the ball into the hole with the fewest strokes from a starting point (tee). Usually the ball is hit through the air to the green upon which it lands and leaves a dent or ball mark. (Greens are closely-cropped grass surfaces on a somewhat loose soil easily dented by the falling ball, which dent (ball mark) interferes with a rolling ball.) After landing on the green, the ball is rolled towards the hole using a putter (usually a hollow metal shaft having a ball-striking blade or head at its lower end and a rubber grip about it at its upper end for holding and swinging it); if the rolling ball strikes a ball mark, it may be deflected in an unwanted direction. Thus the etiquette of golf requires each golfer to repair his ball mark to allow the true skills of subsequent players of the green not to be impeded, and at least one other ball mark (overlooked by an prior golfer).

Today, the repair of golf marks is a tedious task. Usually a small, pocket-carried, two-pronged hand tool is used. The two-pronged hand tool not only requires the golfer to bend over to reach the green surface, but may also require the exercise of substantial hand force (which may be beyond the capabilities of some golfers) to restore the soil to its former condition.

SUMMARY OF THE INVENTION

Accordingly, it is an object of the invention to render the game of golf still more pleasant.

A more specific object of the invention is to ease the job of repairing ball marks on golf-green surfaces.

Another object of the invention is to provide a tool for more easily repairing ball marks on golf greens.

Still another object of the invention is to provide such a tool which does not require a golfer to bend over.

Yet another object of the invention is provide such a tool that requires less golfer force to restore the soil to its former condition.

A further object of the invention is to provide such a tool that does not further encumber the golfer.

A yet further object of the invention is to provide such a tool which is simple of construction and easy of manufacture and installation.

The objects of the invention are accomplished by a ball-mark repair tool which fastens onto the grip end of a golf putter. The repair tool consists of a cylinder of circumferentially arranged blades extending lenthwise of the putter shaft when mounted thereon and being somewhat sharp pointed at their free ends. Cutting edges are formed on the outer edges of the blades by surfaces generally sloping inwardly toward the center of the tool. A plate closes off the lower end of the cylinder and has a central opening to facilitate its mounting on the grip end of a standard putter.

The grip end of the hollow shaft of a putter is usually closed off with the closed end portion of the grip, the closed end portion being centrally formed with a vent hole. Per applicant's invention, an enlarged hole is formed of the vent hole in the grip closed-end portion, to insert an expandable fastener of conventional design within the hollow shaft. The fastener, which is interiorily threaded, is then expanded by screwing a bolt therein until the expandable fastener grasps the interior surface of the shaft. The bolt is then unscrewed and inserted through the central opening in the plate at the bottom of the repair tool. The repair tool is then placed over the grip end of the putter and the bolt again screwed into the fastener until it is snug. The repair tool is now firmly mounted on the putter.

When the tool is inserted down around a ball mark as by upending the putter and forcing down on the shaft, and then rotated back and forth as by using the putter blade or head as a lever, the soil surrounding the ball mark is loosened and forced inward to fill-up the ball mark and enable a flat surface to again exist after the loosened soil has been tamped down by the player.

A frictionally-held cap is provided for covering the greens-tender tool to protect the golfer from the projecting blades.

BRIEF DESCRIPTION OF THE DRAWINGS

These and other objects, features and advantages of the invention will become apparent from a reading of the following description, when considered with the appended drawings wherein.

DETAILED DESCRIPTION OF THE INVENTION

Figure 1:
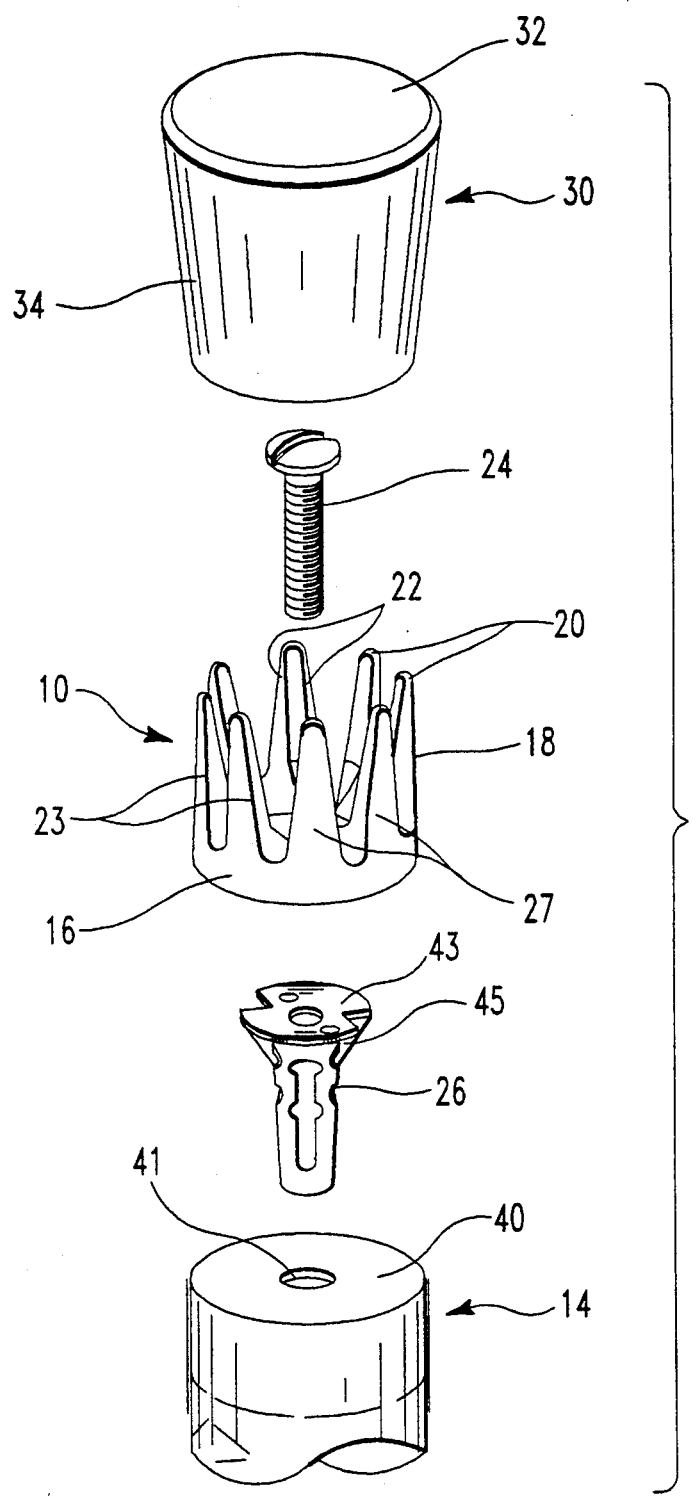
FIG. 1 is an exploded view of a portion of a putter with the greens-tender tool mounted in place.
Figure 2:
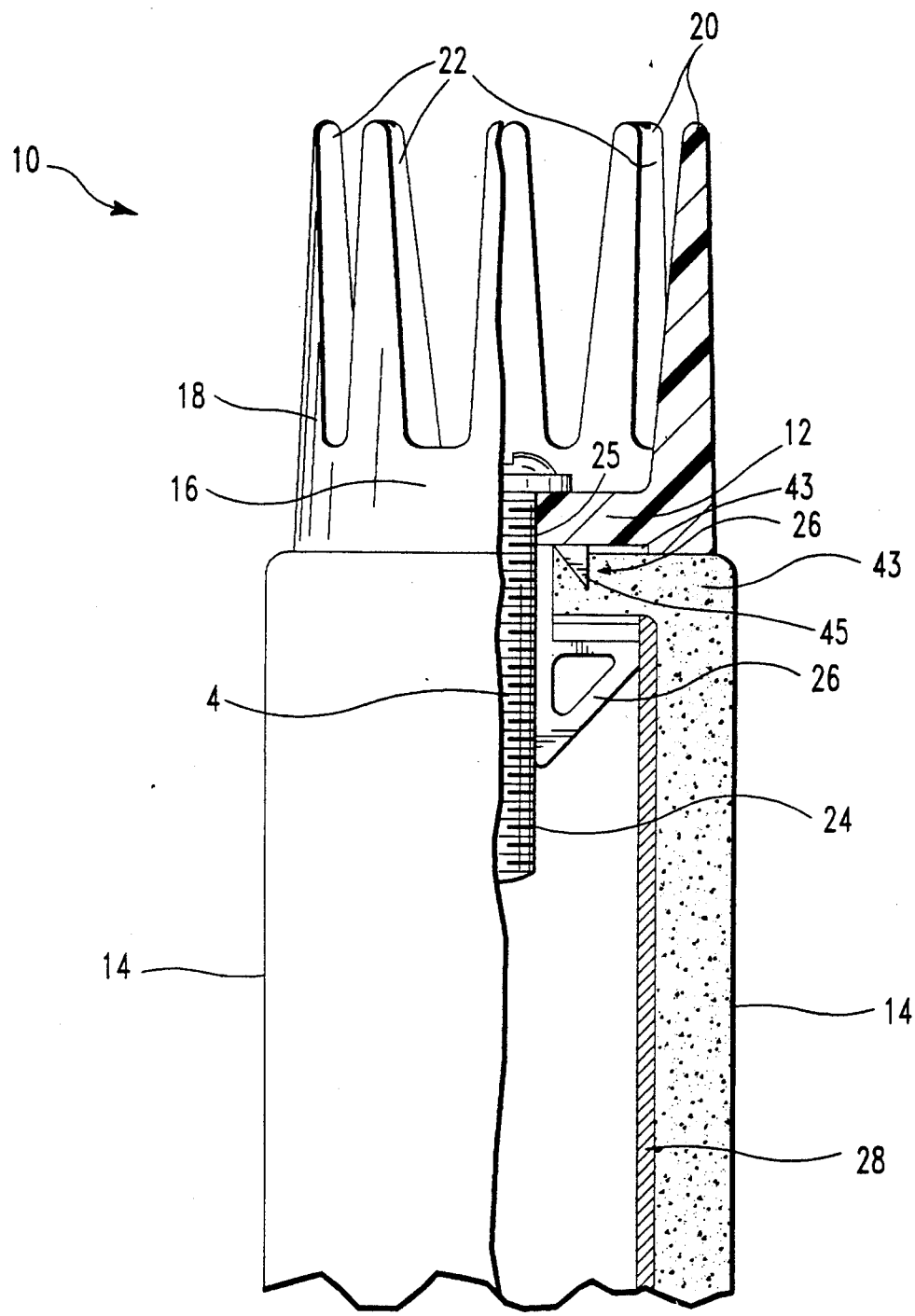
FIG. 2 is a side view, partially broken away, of the upper end of a putter with the greens-tender tool mounted in place.
Figure 3:
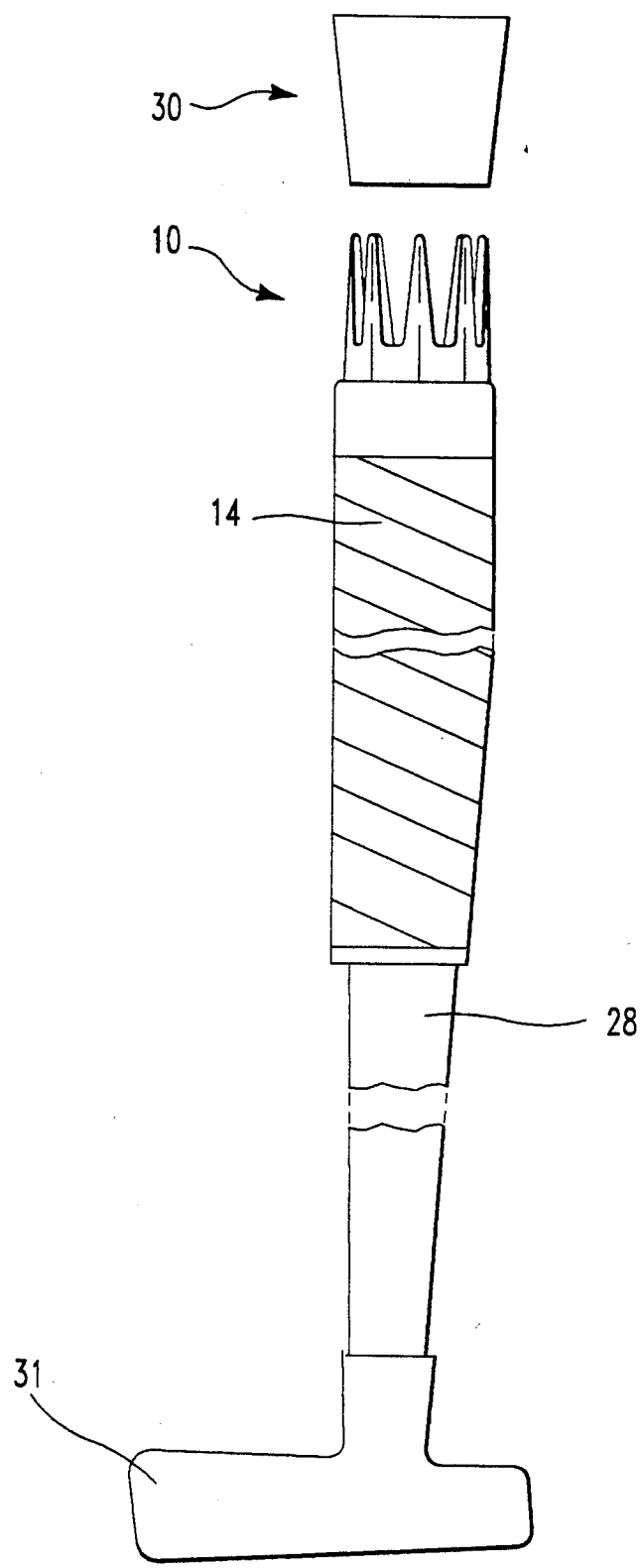
FIG. 3 is a side view, sans a portion of the shaft, of a putter with the greens-tender tool mounted in place.

Referring now to the drawings, the green-tender tool of the invention is generally indicated by the numeral 10. The tool 10 includes a base or plate 12 having a disc-like shape. From the perimeter of the base, a cylinder 16, preferably of a metal such as stainless steel or of a tough plastic, has a diameter approaching that of the putter grip 14 (of a yieldable material such as rubber) and extends upwardly a distance and downwards slightly. The free end of the upper end of the cylinder is cut into tapered blades 18 whose pointed ends 20 facilitate pushing the tool into the soil about a ball mark. The side surfaces 22 of the blades 18 slope inwardly generally toward the center of the cylinder to define a) with the blade outer surfaces 27 soil cutting edges 23 on their outer extremities, and b) plowing surfaces effective to move inward to fill the dent, soil which has been loosened by the cutting edges 23 on rotation of the soil inserted tool in either or both directions.

The disc base 12 has a central opening 25 through which a headed bolt 24 is inserted and threaded into a fastener or plug 26 which has been inserted into the grip end of the hollow putter shaft 28. The bolt 24 holds the lower surface of the base or plate 12 firmly against the upper surface of the fastener 26 gripping the inside surface of the putter shaft 28 and the lower surface of the cylinder 16 against the yieldable end closure portion 40 of the grip 14, so that adequate friction forces obtain to rotate the tool 10 when the putter shaft is turned as by grasping and rotating the bladed end 31 of the putter.

The tool 10 is normally covered by a cap generally indicated by the numeral 30. It consists of a disc-like top base 32 having depending from its periphery a cylinder 34. The outer diameter of the cap cylinder is such that when it is in place over the tool 10, its outer surface forms a smooth continuation with the outer surface of the grip 14 to constitute an unobtrusive addition to the putter. The cap 30 is formed of a material, such as a plastic, resistant to easy cutting by the points 20 and edges 23 on the tool blades 18, yet resilient and elastic enough to slide easily on and off the tool 10 and be frictionally held thereon.

In installation on an existing putter, the conventional vent opening 41 in the center of the end closure portion 40 of the grip 14 on an existing putter shaft 28 would be enlarged by a suitable instrument to accommodate the insertion of a conventional unexpanded fastener 26 (FIG. 1) of suitable size. The fastener 26 is inserted until a plate 43 on its upper end comes to rest on the grip end closure 40. The bolt 24 is then screwed down into it to draw its lower portion upwards and force an intermediate portion outwards until the later's outer edges firmly engage and grip the inside of the putter's hollow shaft 28. Depending flanges 45 sunk into the grip on insertion of the fastener 26 in the opening 41, would have kept the fastener from turning as the bolt 24 was being screwed into it.

The green-tender tool 10 would be mounted in its place on the end of the putter shaft by inserting the bolt 24 through its central opening in the base 12 and screwing it into the fastener or plug 26 until the base 12 firmly engaged the plate 43 of the fastener 26 firmly anchored to the inside of the putter shaft 28 and the lower surface of the cylinder 16 rests upon the end closure portion 40 of the grip 14. The cap 30 would now be placed over the tool 10 to protect the golfer during normal use of the putter.

In use, the golfer having reached the green with a fly ball which left a ball mark (dent) on the green upon landing thereon, would pull off the cap 30 from the end of his putter, turn the putter upside down, and place the points 20 of the blades 18 of the tool 10 about the ball mark. He would then apply downward pressure on the putter shaft 28 to force the pointed ends 20 of the blades 18 into the soil about the ball mark, and would rotate the shaft and hence the tool to the left and right by applying torquing pressure to the putter blade 31. The resulting rotational movements of the tool 10 will cause the blade edges 23 to cut through the soil and the sloping side surfaces 22 of the oncoming blades 18 to plow the soil inward to fill the ball mark. After a sufficient amount of rotation, for which the golfer will develop a feel, the tool is withdrawn from the soil and the cap replaced after appropriate cleaning. (The spacing between the blades is such as to facilitate cleaning by conventional golf tees at hand.) The filled-in ball mark would then be tamped in usual fashion using the putter blade, to restore the green to playing condition.

It will be appreciated that a tool for repairing ball marks has been developed which is easier on the golfer, is easily installed, and simple and easy of manufacture.

While applicant has shown a preferred embodiment of the invention, it will be evident that other and different applications of the principles of his invention will be apparent to those skilled in the art, and that thus it is intended to be limited only by the scope or spirit of the appended claims.

What is claimed is:

1. A golf-green ball-mark repair mechanism comprising a putter having a shaft with a head at one end and a grip at the other end, and a tool on the shaft outside of the grip for repairing ball marks, wherein the tool includes a set of blades projecting away from the grip of the club for insertion into the soil about the ball mark, wherein the blades are straight and arranged in a circle having a diameter approaching that of the grip for encircling a ball mark and taper towards their free ends to define soil penetrating points.

2. A mechanism according to claim 1, wherein the side surfaces of the blades slope inwardly generally towards the center of the set to define soil cutting edges on their outer perimeter.

3. A mechanism according to claim 2, wherein the tool includes a disc-like base mounting on its periphery a cylinder formed with the blades.

4. A mechanism according to claim 2, and a cap for covering the tool when not in use, the cap including a disc-like base with a cylinder depending from the periphery of the base and frictionally embracing the tool.

5. A mechanism according to claim 1, wherein the side surfaces of the blades slope inwardly generally towards the center of the set to define plowing surfaces.

* * * * *